No. 879,981. PATENTED FEB. 25, 1908.
C. L. READE.
GOLF BALL.
APPLICATION FILED JAN. 17, 1907.
Fig. 1.
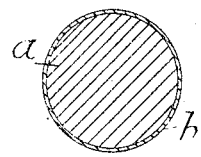
Fig. 2.
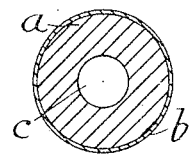
Fig. 3.
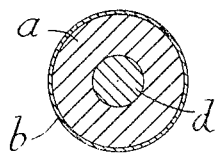
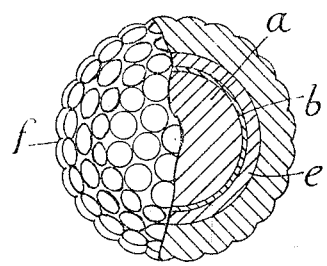
Fig. 4.
Witnesses:
J. Chatwin
C. Chatwin
Inventor:
C. L. Reade
By J. W. Herschel
Atty.

UNITED STATES PATENT OFFICE.

CHARLES LISTON READE, OF BEXHILL, ENGLAND.

GOLF-BALL.

No. 879,981.     Specification of Letters Patent.     Patented Feb. 25, 1908.

Application filed January 17, 1907. Serial No. 352,747.

*To all whom it may concern:*

Be it known that I, CHARLES LISTON READE, a subject of the King of England, residing at Bexhill, in the county of Sussex, England, have invented a new and useful Improvement in Golf-Balls, of which the following is a specification.

My invention relates to the manufacture of golf balls, and the object is to provide a particularly resilient core for same composed of vulcanized rubber soaked in an appropriate hydrocarbon, means being adopted which will prevent the hydrocarbon from evaporating or affecting the outer parts of the ball. I obtain this object by forming a core of a solid or a hollow vulcanized rubber sphere or spherical body of convenient size, or I may produce same from tubing, strip, sheet, cord, thread, shredded, granulated, filed or powdered vulcanized rubber, with or without a gutta-percha or other center, which sphere is then soaked in naphtha, benzene, turpentine, or other hydrocarbon, thereby causing it to swell or increase in bulk until the desired degree of resiliency is imparted to it. In order to prevent evaporation of the hydrocarbon or any injurious effects on the shell of the finished ball, I find it necessary or desirable to incase the hydrocarbonized sphere in a covering of gelatin, sugar, collodion or other appropriate substance or substances.

The invention will be more readily understood from the following specification with reference to the annexed drawings, in which:

Figure 1, shows a section of a plain core; Fig. 2, shows a section of a core formed with a hollow center; Fig. 3, shows a section of a core having a solid nucleus; and Fig. 4, shows a complete ball, partly in section, with my improvements applied thereto.

The portion marked *a* in the first figure represents the resilient portion of the core which is here formed of a solid spherical body of vulcanized rubber soaked in hydrocarbon and incased in a covering *b* of anyone or more of the aforesaid substances, or rubber wrappings which may be previously or subsequently dipped in a saturated solution of same. This spherical body may be produced by molding and vulcanizing shredded, granulated, filed or powdered rubber, or from waste vulcanized rubber. Again, a suitable sphere may be produced by winding tubing, cord, thread, strip or sheet vulcanized-rubber upon itself and treating it in the manner herein specified.

Another form of core is shown at Fig. 2 composed of the resilient portion *a* and covering *b* and having a hollow center *c*, while according to the form shown at Fig. 3, the vulcanized rubber may be wrapped, molded or wound upon a nucleus *d* of rubber, gutta-percha, celluloid, ebonite and so forth, then soaked in hydrocarbon and incased as described.

In some instances I wind upon the hydrocarbonized body, or upon the incased core, a quantity of vulcanized rubber thread, tape, strip or sheet before applying the outer shell of any well known material. When a still higher degree of resiliency is required, the outer winding or covering of vulcanized rubber may itself be hydrocarbonized also.

I have found that when vulcanized rubber is soaked for a sufficient length of time in the hydrocarbon, it increases materially in bulk and gains in resiliency without partially dissolving as raw rubber does.

Whichever construction may be adopted, the portion *a* is always soaked in the hydrocarbon till sufficiently swollen, or it is first fashioned and then treated with the solvent.

By way of an example I would state that a solid vulcanized rubber sphere of say $\frac{3}{8}$ inch diameter and roughly weighing 12 grains, can by soaking in hydrocarbon be readily increased to a diameter of $\frac{5}{8}$ inch and having about double its original weight and also about double the ordinary resiliency, which renders the same particularly adaptable for the core of a golf ball.

The cores prepared in the aforesaid manner can be rendered lighter than water and they impart properties to golf balls not hitherto attained. These cores are ready for further incasement by means of a winding machine or other finishing process for the manufacture of complete balls.

By this improved manufacture of golf balls, an increased internal resiliency is imparted to them and an accelerated spring in the drive is insured while at the same time they have a strong tendency to muffle in slight strokes.

I claim:—

1. In a golf-ball, the combination with an outer shell of a swollen hydrocarbonized resilient core of vulcanized rubber and a vapor-proof covering for said core, as and for the purpose set forth.

2. In a golf-ball, the combination with the outer shell, of a swollen hydrocarbonized resilient core of molded vulcanized rubber and a vapor-proof covering for said core as set forth.

3. In a golf-ball, the combination with the outer shell, of a swollen hydrocabonized resilient core of vulcanized rubber, a vapor-proof covering around said core and hydrocarbonized windings of vulcanized rubber between said covering and the shell, as set forth.

CHARLES LISTON READE.

Witnesses:
GERALD NOBLE RICHARDSON,
NORMAN ALEXANDER SCRULTON.